Figure 1:
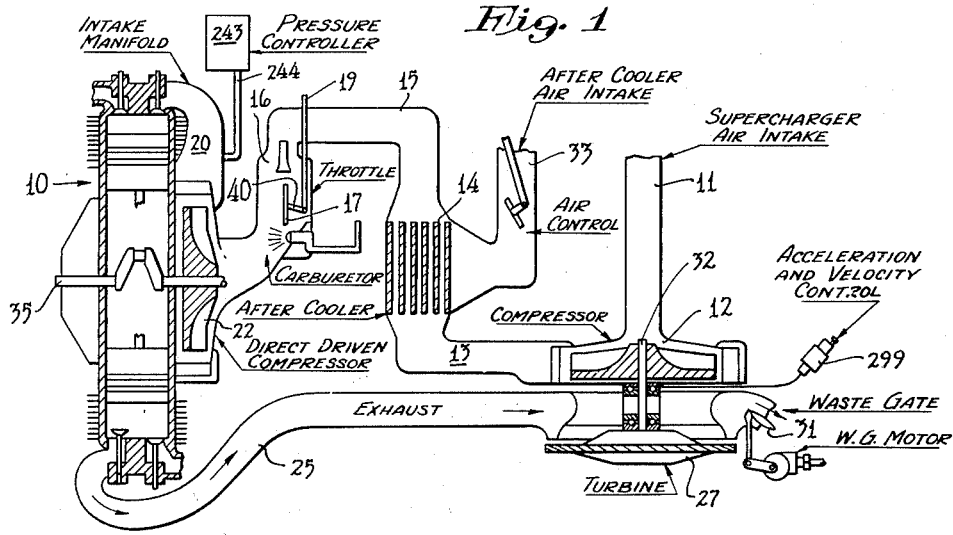

Inventor
Albert E. Baak
Attorney

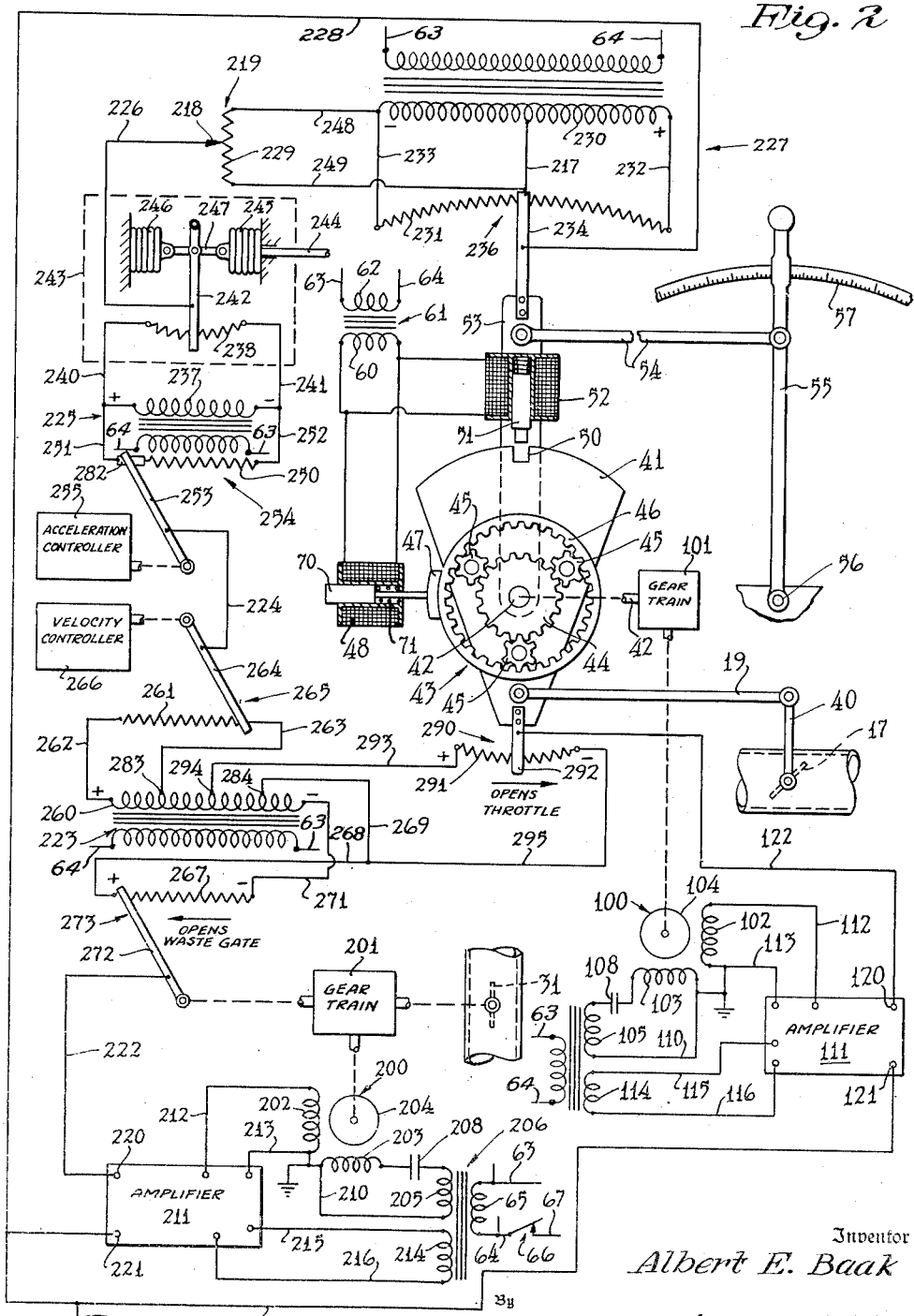

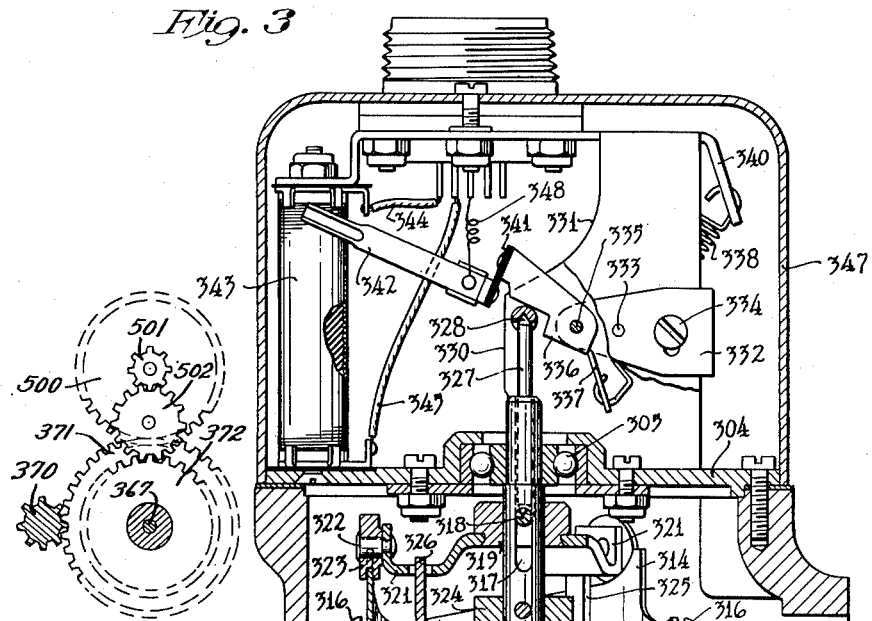
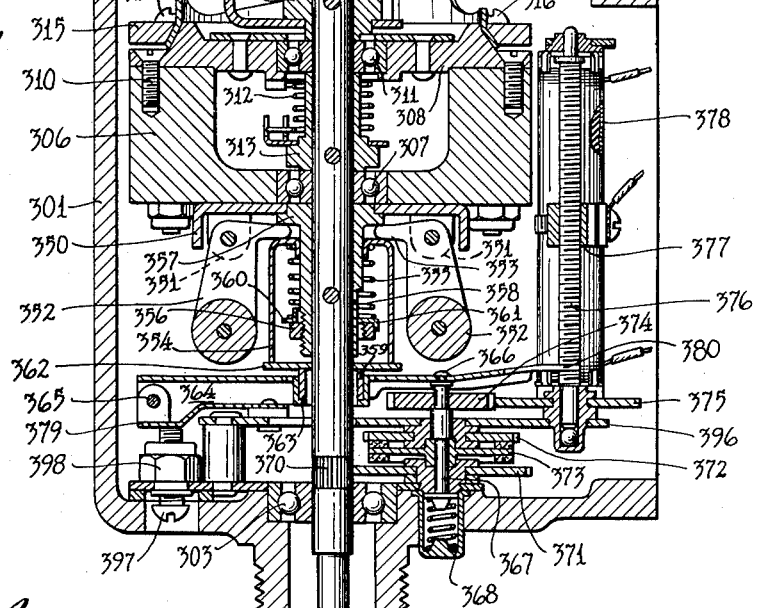
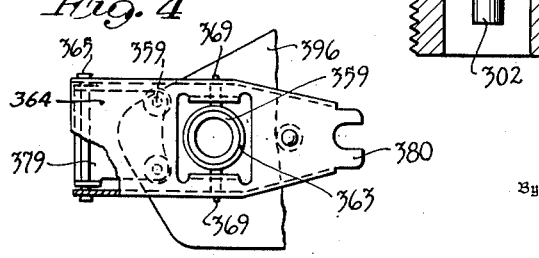

Dec. 25, 1951

A. E. BAAK 2,579,643

MANUAL AND AUTOMATIC CONTROL APPARATUS
FOR COMBUSTION ENGINES

Filed April 21, 1943

4 Sheets-Sheet 4

Inventor
Albert E. Baak

George H. Fisher
Attorney

Patented Dec. 25, 1951

2,579,643

UNITED STATES PATENT OFFICE 2,579,643

MANUAL AND AUTOMATIC CONTROL APPARATUS FOR COMBUSTION ENGINES

Albert E. Baak, Los Angeles, Calif., assignor to Minneapolis-Honeywell Regulator Company, Minneapolis, Minn., a corporation of Delaware Application April 21, 1943, Serial No. 483,901

14 Claims. (Cl. 60—13)

1

The present invention relates to control apparatus, and particularly to apparatus wherein a control device is operated either automatically in response to the changes in a variable condition or by a manual control.

In many cases where a device is normally automatically controlled, it may be desired under certain conditions, as for example in case of power failure, to control the device manually. This manual operation of the normally automatically controlled device may be desirable because of considerations of safety or convenience, or for other reasons.

In the following specification, I have illustrated my invention as applied to a system for controlling the position of a throttle of an internal combustion engine. My invention has particular utility in such a system, but it should be understood that its utility is not limited to the specific system in which it is disclosed.

An object of my invention is to provide an improved control system, in which a control device is normally positioned in accordance with the variations of a variable condition, and in which means are provided for manually positioning the device.

Another object of my invention is to provide an improved electrical control system in which a device is normally automatically controlled by an electrical motor, and in which control of the device is transferred from the motor to a manually operable controller whenever for any reason the supply of power to the motor is discontinued. A further object is to provide, in such a system, means whereby the control of the device is taken away from the manual lever and restored to the motor upon the return of the power supply to the motor.

Another object of my invention is to provide an improved control system in which a control device is normally automatically positioned so as to maintain a variable condition at a predetermined value, but in which the device may be controlled under certain conditions by a manually operable lever, and in which means is provided whereby the same manually operable lever may be used during automatic control to establish the value of the variable condition which is maintained by the control system.

A further object of my invention is to provide an improved system for controlling the pressure in the intake manifold of an internal combustion engine, including power means normally effective to position the throttle, and means operative upon the discontinuance of the power supply to said

2 power means for placing the throttle under manual control.

Other objects and advantages of my invention will become apparent from a consideration of the appended specification, claims and drawings in which Figure 1 is a somewhat diagrammatic illustration of an internal combustion engine of a type generally used on aircraft, together with the air induction and exhaust systems associated with that engine.

Figure 2 is a somewhat diagrammatic illustration of an electrical control system for the throttle and the super-charger in the system of Figure 1, whereby the pressure in the intake manifold of the engine may be automatically controlled, in which there is shown in some detail an arrangement by which the throttle may be manually positioned.

Figure 6:
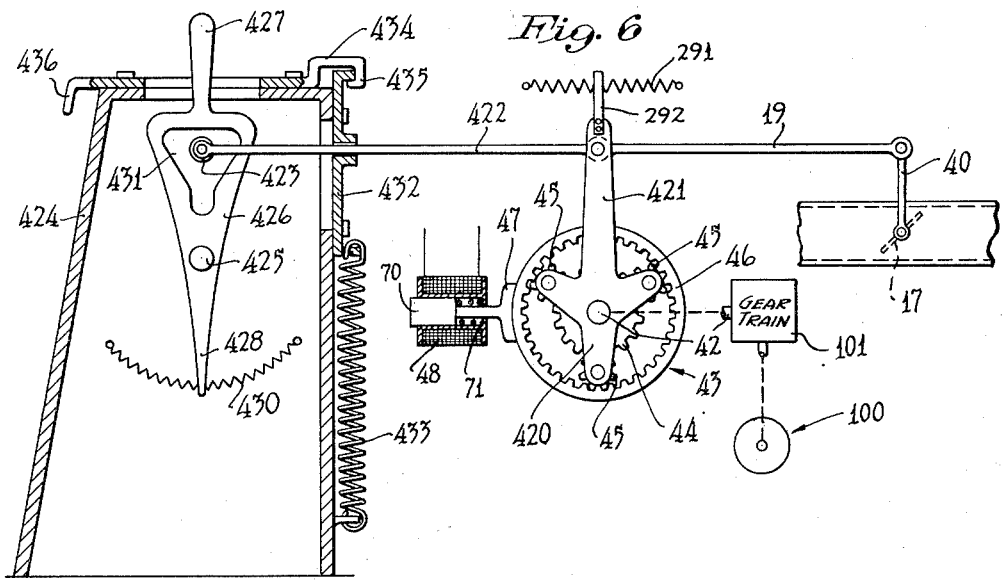
Figure 7:
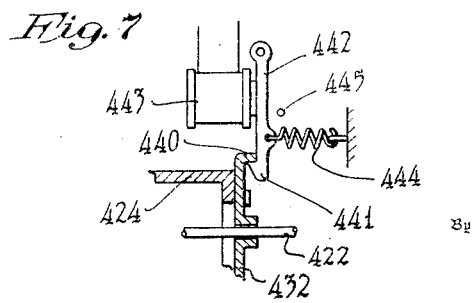
Figure 8:
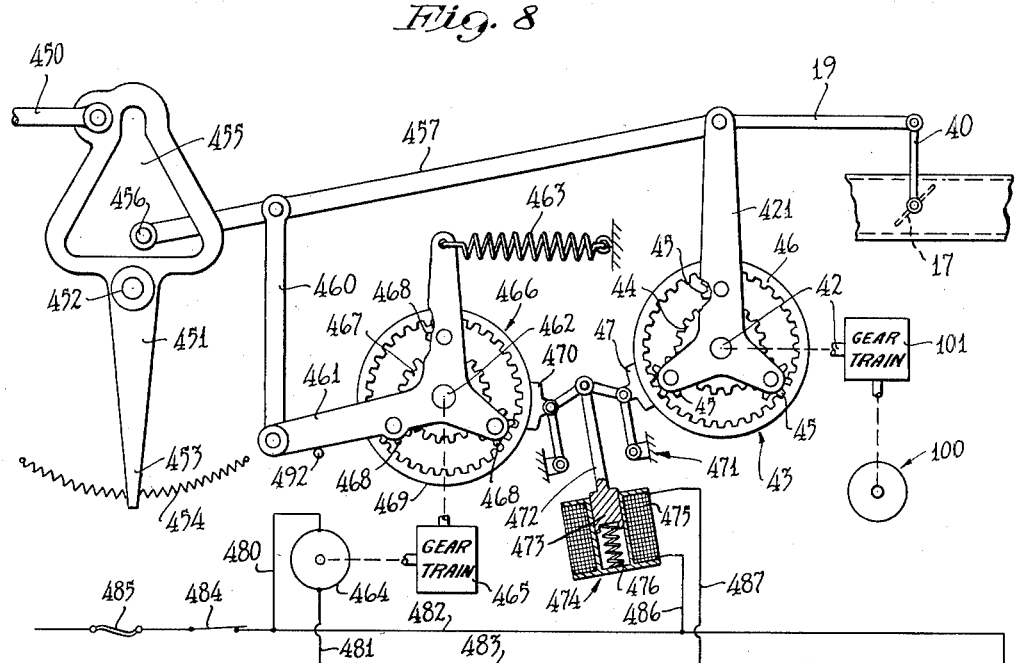
Figure 5:
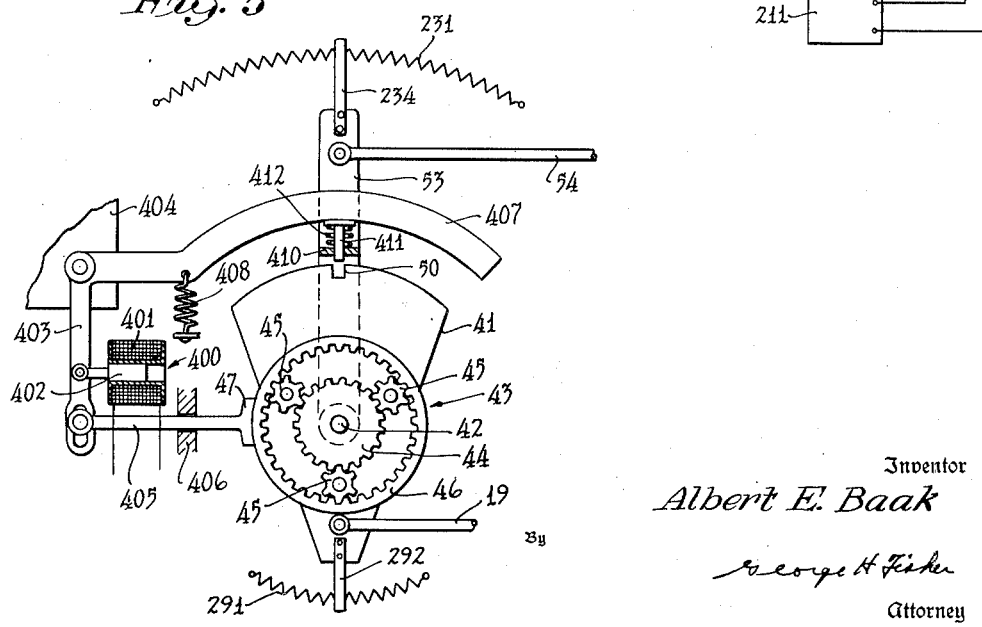

Figure 3 shows, in sectional elevation, a velocity and acceleration responsive control device used in the system of Figure 2, Figure 3A shows certain details of gearing for the apparatus of Figure 3, Figure 4 illustrates a detail of the device shown in Figure 3, Figure 5 illustrates a modification of the means for shifting the throttle from automatic to manual control, which is applicable to the system of Figure 2, Figure 6 illustrates a different type of mechanism for shifting the throttle from automatic to manual control, Figure 7 illustrates an automatically controlled latch which may be substituted for the manually controlled latch of Figure 6 and Figure 8 illustrates still another modification of the arrangement shown in Figure 2 for shifting the throttle from manual to automatic control.

Referring to Figure 1, there is schematically shown an internal combustion engine 10 of a type generally used in aircraft. The air for supporting combustion in the engine 10 passes from an intake 11 through a turbo-compressor 12, a conduit 13, an after-cooler 14, a conduit 15, a carburetor 16 in which a throttle valve 17 is located, an engine driven compressor 22, and an intake manifold 20 to the engine 10.

The exhaust gases from the engine pass through an exhaust manifold 25 and a turbine 27. A waste gate or valve 31 is provided, by means of which gases may be bled from the exhaust manifold 25 and permitted to pass directly to the outside air without passing through the turbine 27.

The turbo-compressor 12 is driven by the turbine 27 through a shaft 32.

The after-cooler 14 is provided to reduce the temperature of the air leaving the turbo-compressor 12, wherein the temperature is increased due to the heat of compression. In the after-cooler, the compressed air received from the turbo-compressor 12 is passed in heat exchange relation with cooling air received from an intake 33, which is discharged to the atmosphere after passing through the after-cooler.

In the carburetor 16, fuel from a supply not shown is mixed with the air. The throttle 17 may be positioned by operation of a link 19 to which it is connected by a lever 40.

The engine driven compressor 22 is direct-driven by the engine 10 through the shaft 35. Such a direct-driven compressor is usually geared up so that it rotates faster than the engine, and in many engines is utilized not only as a compressor but to distribute evenly the mixture of fuel and air to the various engine cylinders.

FIGURE 2

Referring to Figure 2, it may be seen that the waste gate 31 is driven by a motor 200 through a gear train 201. The motor 200 is of the split phase type, being provided with a pair of field windings 202 and 203, which are spaced 90 electrical degrees apart, and an armature 204. The field winding 203 is supplied with electrical energy from a secondary winding 205 of a transformer 206. The energizing circuit for winding 203 may be traced from the upper terminal of secondary winding 205 through a condenser 208, motor field winding 203, and a conductor 210 to the lower terminal of secondary winding 205.

The flow of electrical energy to the field winding 202 is controlled by an amplifier 211, which is connected to the winding 202 through a pair of conductors 212 and 213. The amplifier 211 is supplied with electrical energy from another secondary winding 214 of transformer 206. The amplifier 211 is connected to the secondary winding 214 through a pair of conductors 215 and 216.

The amplifier 211 is provided with a pair of signal input terminals 220 and 221, and operates to supply the motor field winding 202 with alternating current of a phase dependent upon the phase of an alternating signal potential impressed upon the input terminals 220 and 221. Any suitable amplifier having such a characteristic may be used, but I prefer to use one of the type shown in Figure 1 of the co-pending application of Albert P. Upton, Serial No. 437,561, filed April 3, 1942, now Patent No. 2,423,534, dated July 8, 1947.

As stated above, the link 19 has one end connected to the throttle 17 by the lever arm 40 which is in turn directly connected to the throttle valve 17. The other end of the link 19 is pivotally attached to a plate 41 which is mounted to freely rotate on a shaft 42. The shaft 42 may be drivingly connected to the plate 41 by means of a planetary gear mechanism generally indicated at 43. This planetary gear mechanism includes a sun gear 44 fixed on the shaft 42, a plurality of planet gears 45 carried by stub shafts mounted on the plate 41, and a ring gear 46 which is concentric with the sun gear 44 and engages the planet gears 45. The ring gear 46 may be supported by any suitable means (not shown), which maintains it in engagement with the planet gears 45. The outer surface of the ring gear 46 is smooth, and forms a drum which cooperates with a brake shoe 47. The brake shoe 47 is connected to the armature 70 of an electromagnet 48. The armature 70 is biased to the left by a spring 71. When the electromagnet 48 is energized, the armature 70 is moved to the right against the force of spring 71, so that the brake shoe 47 is held in engagement with the drum surface of the ring gear 46, thereby holding the gear 46 locked against rotation. When the ring gear 46 is thus locked, a driving relation is established between shaft 42 and the plate 41, as will be readily understood by those familiar with conventional planetary gearing arrangements. The shaft 42 is driven by a motor 100 through a gear train 101. The motor 100 is of the same general type as motor 200, being provided with a pair of field windings 102 and 103, spaced 90 electrical degrees apart and an armature 104. The field winding 103 is supplied with electrical energy from a transformer secondary winding 105. The energizing circuit for winding 103 may be traced from the upper terminal of secondary winding 105 through a condenser 108, field winding 103 and a conductor 110 to the lower terminal of secondary winding 105.

The flow of electrical energy to field winding 102 is controlled by an amplifier 111, which is connected to the field winding 102 through a pair of conductors 112 and 113. The amplifier 111 is supplied with electrical energy from another transformer secondary winding 114. The amplifier 111 is connected to the secondary winding 114 through a pair of conductors 115 and 116.

The amplifier 111 is provided with a pair of signal input terminals 120 and 121, and operates to supply the motor field winding 102 with an alternating current of a phase dependent upon the phase of an alternating signal potential impressed upon the input terminals 120 and 121. The amplifier 111 may be of the same type as amplifier 211.

The plate 41 is provided with an arcuate surface concentric with the shaft 42, and notched, as at 50, to receive the armature 51 of an electromagnet 52. The electromagnet 52 is mounted on an arm 53, which is freely rotatable on the shaft 42. A link 54 is pivotally attached to the upper end of arm 53 and the other end of link 54 is pivotally attached to a manually operable control lever 55 which rotates about a fixed pivot 56. The free end of the lever 55 moves adjacent a stationary scale 57.

The electromagnets 48 and 52 are connected in parallel to the terminals of a secondary winding 60 of a transformer 61 having a primary winding 62 connected to supply lines 63 and 64.

The transformer 206 for the waste gate motor has a primary winding 65, which is also connected to supply lines 63 and 64. A switch 66 connects the supply line 64 with a line 67 extending to the source of electrical energy for the system. The transformer secondary windings 105 and 114 may also be located on the transformer 206, or on another transformer whose primary winding is connected to the lines 63 and 64.

Considering the motor 200, it will be seen that the phase of the current flowing in winding 203 is fixed with respect to the phase of the voltage supplied to lines 63 and 64 by the source of energy. From the well known characteristics of split phase motors, it will be understood that if the field winding 202 is supplied with alternating current which leads the current supply to winding 203 by 90 electrical degrees, the motor 200 rotates in one direction, while if the field winding 202 is supplied with current which lags the current in winding 203 by 90 degrees, the motor 200 runs in the opposite direction. Similarly, the direction of rotation of motor 100 depends upon the phase of the current supplied to winding 102 with respect to the fixed phase of the current supplied to winding 103.

The alternating signal potentials applied to the input terminals 220 and 221 of amplifier 211 and to the input terminals 120 and 121 of amplifier 111 are determined by the electrical conditions existing in a compound network, which consists of three electrical networks connected in series. The circuit between the amplifier input terminals 220 and 221 may be traced from terminal 220 through a conductor 222, a first electrical network 223, a conductor 224, a second electrical network 225, a conductor 226, a third electrical network 227, and a conductor 228 to amplifier input terminal 221.

A similar electrical circuit may be traced from amplifier input terminal 120 through a conductor 122, the first network 223, conductor 224, the second network 225, the conductor 226, the third network 227, and conductor 228 to amplifier input terminal 121.

The network 227 includes a transformer secondary winding 230, across the terminals of which is connected a slidewire resistance 231, by means of conductors 232 and 233. The conductor 228 is connected to a slider 234 which cooperates with resistance 231. The slider 234 is mounted on the end of arm 53, and is movable along the resistance 231 by manipulation of the manually operable lever 55. The slider 234 and the resistance 231 together form a control point adjuster 236 for the control system.

Another slide wire resistance 229 has one of its terminals connected by a conductor 248 to the left terminal of secondary winding 230, and the opposite terminal of resistance 229 is connected by a conductor 249 to a center tap on secondary winding 230. A slider 218 cooperates with the resistance 229, and is manually adjustable with respect to that slide wire. Slider 218 and the resistance 229 together form a calibrating potentiometer 219.

The center tap on winding 230 is connected to the center of resistance 231 by a conductor 217. The conductor 217 is provided to decrease the impedance of the network between slider 234 and slider 218, and does not otherwise affect the operation of the system.

The electrical network 225 includes a secondary winding 237, across whose terminals a slidewire resistance 238 is connected by means of conductors 240 and 241. A slider 242 cooperates with resistance 238, and is connected to conductor 226. The resistance 238, the slider 242, and the operating mechanism therefor together form a primary pressure controller 243.

The pressure controller 243, which is shown diagrammatically in Figure 1, operates to move the slider 242 along the resistance 238 in accordance with the absolute pressure existing within the intake manifold 20. The pressure controller 243 includes a bellows 245, the interior of which is connected through a pressure take-off duct 244 to a point within the intake manifold, the pressure in which is to be controlled by this system. A second bellows 246 in the controller 243 is evacuated, so that its expansion and contraction depends only upon atmospheric pressure. The two bellows 245 and 246 are mounted with their free ends extending toward each other, and those free ends are connected by a link 247. An intermediate point on the link 247 is connected, as by a pin and slot connection, with the slider 242. The slider 242 is mounted for pivotal movement about its upper end.

As stated above, the interior of bellows 246 is evacuated, and its exterior is exposed to atmospheric pressure, so that it exerts a force tending to move the link 247 to the left, whose magnitude is dependent upon the atmospheric pressure. Since the exterior of bellows 245 is also exposed to atmospheric pressure, that pressure exerts a force tending to collapse the bellows 245 and to move the link 247 to the right, thereby opposing and cancelling the force exerted by bellows 246 tending to move link 247 to the left. Since the interior of bellows 245 is exposed to the pressure to be controlled, it may be seen that this pressure exerts a force acting on the link 247 towards the left, and that this force is opposed only by the resilience of the bellows 245 and 246. Therefore, the position of slider 242 with respect to resistance 238 is a measure of the absolute pressure within the intake manifold 20.

A second slidewire resistance 250 is also connected across the terminals of secondary winding 237, through conductors 251 and 252. A slider 253 cooperates with the resistance 250 and is connected to conductor 224. The resistance 250 and the slider 253 together form an acceleration compensating controller 254. The controller 254 is operated in accordance with the acceleration of the turbine shaft 32 by an acceleration responsive control device schematically indicated at 255. A suitable acceleration responsive control device 255 is described in detail in Figure 3. For the present purposes, it may be stated that the slider 253 is maintained in the position shown in the drawing as long as the turbine shaft 32 (see Fig. 1) rotates at a constant speed. Upon acceleration of the shaft 32, the slider 253 is moved to the right along resistance 250. A contact 282 provides a "dead spot" at the left end of the resistance 250, so that small accelerations of the turbine 27 have no effect on the control system.

The network 223 includes a transformer secondary winding 260. A slidewire resistance 261 is connected by a conductor 262 to one terminal of secondary winding 260 and by a conductor 263 to a tap 283 at an intermediate point on secondary winding 260. A slider 264 cooperates with resistance 261 and is connected to conductor 224. The slider 264 and resistance 261 together form a velocity responsive compensating controller 265, which is operated by a velocity responsive control device schematically indicated at 266. The details of the velocity responsive control device 265 are shown in detail in Figures 3 and 4.

The network 223 also includes a waste gate follow-up potentiometer 273 and a throttle follow-up potentiometer 290. The waste gate follow-up potentiometer 273 includes a slidewire resistance 267 and a slider 272 cooperating therewith. The slider 272 is connected to conductor 222, and is moved along the resistance 267 by the motor 200 acting through the gear train 201, concurrently with the operation of the waste gate 31. The left terminal of resistance 267 is connected through a conductor 268 and a conductor 269 to an intermediate tap 284 on secondary winding 260. The right terminal of resistance 267 is connected through a conductor 271 to the right terminal of secondary winding 260.

The left terminal of resistance 291 is connected through a conductor 293 to a tap 294 on secondary winding 260 located between the taps 283 and 284. The right terminal of resistance 291 is connected through a conductor 295 and conductor 269 to tap 284. The slider 292 is fixed on the plate 41 and therefore moves across the resistance 291 concurrently with the movement of the throttle 17.

All the secondary windings 230, 237 and 260 are on the same transformer, which may be the transformer 206, or another transformer whose primary winding is connected to the same supply lines 63 and 64 as the primary winding 65 of transformer 206. Therefore, the alternating potentials at the terminals of these three transformer windings are in phase with each other. The signal potentials impressed on the input terminals of the amplifiers 111 and 211 are therefore the algebraic sums of a number of potentials produced in the networks 223, 225 and 227.

*Operation of Figures 1 and 2*

For the sake of convenience in considering the operation of this system, let us consider only the potential conditions existing during a half cycle when the terminals of the transformer windings have the polarities indicated by the legends in the drawings. In other words, the left terminals of windings 237 and 260 are considered as positive, and the right terminal of secondary winding 230 is considered as positive. In order to have a reference potential, the conductor 228 may be considered as being grounded, as indicated at 285. If the potential conditions in the circuit are thus considered during one-half cycle, it will be understood that the potential conditions during the opposite half-cycle are opposite. The consideration of the potential conditions during only one-half cycle merely forms a convenient way of considering the phase relationships of the alternating potentials which actually exist in the system.

Considering first the network 227, it may be seen that when the slider 234 is at the position shown in the drawing, its potential is the same as that of the center tap on secondary winding 230. At the same time, the slider 218 is at an intermediate point along the resistance 229 and hence its potential is negative with respect to the center tap on winding 230. It may therefore be seen that the network 227 introduces into the series circuit connecting the amplifier input terminals a potential of a polarity such that slider 218 and conductor 226 are made negative with respect to the grounded conductor 228.

Considering next the network 225, it will be seen that when the sliders 242 and 253 are in the positions shown in the drawing, the network 225 introduces into the series circuit a potential whose magnitude depends upon the potential of slider 242 with respect to the left terminal of secondary winding 237. This potential is of a polarity such that slider 253 is positive with respect to slider 242. The potential of slider 253 with respect to ground depends upon the relative magnitude of the opposing potentials introduced by the networks 227 and 225. For the purposes of the present discussion, it may be assumed that the potential introduced by network 225 is larger than that introduced by network 227, and hence that slider 253 is positive with respect to ground.

Considering now the network 223, it may be seen that since the slider 264 is at the extreme right end of its associated resistance 261, the conductor 263 is at the same positive potential with respect to ground as slider 253. The resistance 291 of the throttle follow-up potentiometer 290 and the resistance 267 of the waste gate follow-up potentiometer 273 are both connected to the secondary winding 260 in such a manner that their left terminals are positive with respect to their right terminals. Also, the right terminal of resistance 291 is in the same potential as the left terminal of resistance 267. When the slider 292 of the throttle follow-up potentiometer is at the position shown in the drawing, at the center of resistance 291, the potential of the slider 292 is equal to the potential of a point on the secondary winding 260 half way between the taps 294 and 284. This point on the winding 260 is negative with respect to tap 283 which, as was just shown, is positive with respect to ground. It may be assumed that the potential difference between tap 283 and the slider 292 is exactly equal and opposite in polarity to the positive potential of tap 283 with respect to ground. Therefore the slider 292 is at ground potential. Since the slider 292 is connected through conductor 122 to input terminal 120 of amplifier 111, it may be seen that input terminal 120 is at ground potential. Since input terminal 121 is grounded through conductor 228 and ground connection 285, no potential difference exists between the input terminals of amplifier 111. Therefore, the winding 102 of motor 100 is not energized, and the motor does not operate. The throttle 17 remains in the position shown in the drawing. The left terminal of resistance 267, and hence the slider 272, is at a potential more negative than that of slider 292. Since the slider 292 is at ground potential, the slider 272 is negative with respect to ground and hence the input terminal 220 of amplifier 211 is negative with respect to ground. It may be assumed that the connections of amplifier 211 are such that when the input terminal 220 is negative with respect to ground, that the winding 202 of motor 200 is energized with current of a phase which causes rotation of the motor 200 in a direction to open the waste gate 31. Since the waste gate 31 is already wide open, it is in engagement with a suitable stop structure (not shown), and hence the motor 200 is stalled.

As mentioned above, the connections of amplifier 211 are so arranged that when the input terminal 220 is negative with respect to conduit terminal 221, the motor 200 is caused to operate in a direction to open the waste gate. When the input terminal 220 is positive with respect to grounded terminal 221, the motor 200 is operated in a direction to close the waste gate. Similarly, the connections of amplifier 111 are such that when input terminal 120 is negative with respect to ground, the motor 100 is operated in a direction to close the throttle 17. When the input terminal 120 is positive with respect to grounded terminal 121, the motor 100 is operated in a direction to open the throttle 17. It may be stated that both the throttle motor 100 and the waste gate motor 200 are operated in a direction of increasing safety when the ungrounded terminals of their associated amplifiers are made negative with respect to ground, and that these motors operate their respective load devices in a direction of increasing activity when the ungrounded terminals of their associated amplifiers are positive with respect to ground.

It should be noted that the position of the slider 292 adjacent resistance 291 has no effect on the control potential applied to terminals 220 and 221 of amplifier 211 associated with the waste gate. Similarly, the position of slider 272 with respect to resistance 267 has no effect on the control potential impressed between input terminals 120 and 121 of the throttle amplifier 111. There remains to be considered the controlling effect on both the waste gate and the throttle of changes in the position of the primary pressure controller 223, the acceleration responsive controller 255, the velocity responsive controller 256, the control point adjuster 236, and the calibrating potentiometer 219.

As the potential of the conductor 224 connecting networks 225 and 223 increases in a positive sense due to an operation of one of the potentiometers in the networks 227 and 225, it may be seen that the potential of slider 264, conductor 263 and tap 283 likewise become more positive with respect to ground. This positive potential is transmitted through the network 223 to the slider 292, conductor 122 and amplifier input terminal 120. As previously stated, a potential of this polarity applied to input terminal 120 causes the motor 100 to drive the throttle 17 in an opening direction. At the same time, the slider 292 is moved to the right along resistance 291, thereby reducing the positive potential applied to amplifier input terminal 120. As soon as this positive potential is reduced to zero, the motor 100 stops, and the system is again balanced with the throttle in a new position. If the positive potential at the tap 283 continues to increase, the throttle 17 eventually reaches its fully open position, at which time the slider 292 is at the extreme right terminal of resistance 291. If the potential at tap 283 still continues to increase in a positive sense, the potential of slider 272 and hence of amplifier input terminal 220, also becomes positive with respect to ground. As previously stated, this causes the motor 200 to rotate in a direction to close the waste gate, and to operate the slider 272 to the right along resistance 273 to restore the input terminal 220 to ground potential. At this time, an additional positive potential is applied to input terminal 120 of amplifier 111, but the motor 100 is then stalled, since the throttle 17 is already in its fully open position.

It may therefore be seen that, as the potential at the conductor 224 increases positively with respect to ground, the system operates first to open the throttle and after the throttle is fully open to close the waste gate.

Considering now the effect of the operation of the primary pressure controller 243 on the system, it may be seen that as the pressure supplied from the intake manifold 20 through the duct 244 to the bellows 245 increases, the slider 242 is moved to the left along resistance 238 and the conductor 224 is thereby made less positive with respect to ground. On the other hand a decrease in the pressure within the bellows 245 causes the slider to move to the right along resistance 238, thereby making the conductor 224 more positive with respect to ground. Thus it may be seen that an increase in the controlling pressure causes the waste gate to be opened and, after the waste gate is fully opened, the throttle is moved toward its closed position. The operation of the waste gate toward its open position has a decreasing effect on the controlling pressure, and likewise the movement of the throttle toward closed position has a decreasing effect on the controlling pressure. Hence the system responds to an increase in the controlling pressure by causing a pressure decrease tending to restore it to its previous value. Likewise the system responds to a decrease in the controlling pressure by causing a suitable operation of the throttle or the waste gate to again increase the pressure and restore it to its desired value.

In a similar manner, it may be seen that a movement of the slider 253 to the right by the acceleration responsive controller 255 causes a more negative potential to be impressed on the input terminals 120 and 220, and hence causes an operation of the throttle or the waste gate in a pressure decreasing direction. The purpose of the acceleration responsive controller 255 is to anticipate changes in the pressure at the intake manifold 20 which are caused by acceleration of the turbine-driven supercharger. Due to the inherent lag in the system, the increased pressure will not be observed at the intake manifold until some time after the acceleration of the turbine and supercharger has taken place. Hence, if the controller 255 were not provided, the pressure controller 243 might continue to call for increased speed of the supercharger at a time when the supercharger was already moving fast enough to supply the required pressure to the intake manifold after steady pressure conditions had become established. This would cause the control system to overshoot with the result that the pressure being controlled would hunt or oscillate about the desired value which the system was supposed to maintain. By utilizing the acceleration responsive controller 255, the system anticipates the increase in pressure which will result from the increased speed of the turbine, and the waste gate is thereby slowed down before the pressure has reached the desired value and finally stopped at a position where the pressure is maintained exactly at that value.

When the slider 264 is moved to the left from the position shown in the drawing, the potential of the input terminals 120 and 220 of the throttle and waste gate amplifiers are made increasingly negative, and hence a motion of the waste gate in a pressure decreasing direction is caused. The controller 266 operates as a limit controller to prevent the turbine and supercharger from operating at too high a speed. As explained in more detail in connection with Figures 3 and 4, the velocity controller 266 operates the slider 264 across resistance 261 as a time function of velocity. In this way, a resilient upper limit to the velocity of the turbine and supercharger is provided, which effectively limits the speed in which the turbine can rotate, but nevertheless at any given speed of the turbine permits an increase in speed if required.

If the slider 234 is moved to the right from the position shown in the drawing, the potentials applied to the input terminals 120 and 220 are made increasingly negative with respect to ground. This causes a pressure decreasing movement of the throttle or waste gate, and hence a decrease in the pressure within the bellows 245. The slider 242 therefore assumes a new position along resistance 238 so that the system is again balanced, but with a new and lower value of pressure in the carburetor 16. Similarly, a movement of slider 234 to the left along resistance 231 results in the establishment of an increased pressure value within the intake manifold. Hence, the movement of slider 234 is said to adjust the control point of the system.

The calibrating potentiometer 219 is provided to make small adjustments in the output potential of network 227 in order that the position of the lever 55 adjacent the scale 57 may accurately indicate the pressure value being maintained by the system in the intake manifold.

If, while the system of Figure 2 is operating to automatically control the pressure of the air supplied to the intake manifold, the power supply should fail, the deenergization of the electromagnet 48 results in the movement of the core 70 to the left under the influence of the biasing spring 71, thereby disengaging the brake shoe 47 from the surface of the ring gear 46. At the same time, the sun gear 44 is effectively locked, since the motor 100 is deenergized and its rotor 104 is therefore stationary, and because the rotor 104 is very difficult to move from the low-speed end of the reduction gear train 101.

At the same time, deenergization of electromagnet 52 allows the core 51 to drop into the notch 50, if the core 51 and the notch 50 happen to be aligned as indicated in the drawing. If the core 51 and the notch 50 are not aligned when deenergization of the electromagnet 52 takes place, the core 51 will engage the arcuate surface of the plate 41. Then, by moving the lever 55, the operator can move the electromagnet 53 above the plate 41 until the core 51 is aligned with the notch 50 whereupon the core 51 drops into the notch. After the core 51 engages the notch, the pilot of the aircraft can, by moving the lever 55, manually position the throttle 17. The motion is transmitted from the lever 55 through the link 54, the arm 53, the electromagnet core 51, the plate 41, the link 19 and the lever arm 40, to throttle valve 17. When the plate 41 is moved in that manner, the planet gears 45 rotate about the sun gear 44, the free ring gear 46 permitting such rotation.

It should therefore be apparent that I have provided a system wherein the position of the throttle is normally automatically controlled in accordance with the intake manifold pressure and other controlling conditions, but wherein upon the failure of the power supply to the automatic control system, the throttle is mechanically connected to the same lever which during automatic operation serves to adjust the control point of the system. Furthermore, it will be apparent that by opening the switch 66, the pilot of the aircraft can manually discontinue the supply of power to the system at any time, so that he can place the throttle under manual control at will. It should also be apparent that upon restoration of power to the system, the throttle is again placed under automatic control without attention on the part of the operator. The return of power to the system results in the energization of the electromagnets 48 and 52, thereby disconnecting the arm 53 from the plate 41 and locking the ring gear 46 against rotation. The lever 55 is mechanically disconnected from the throttle 17 when the core 51 is withdrawn from the notch 50, and the motor 100 is operatively connected to the throttle 17 when the ring gear 46 is locked.

FIGURES 3 AND 4

There is shown in Figure 3 a control device which includes an acceleration responsive controller which may be used as the controller 255 of Figure 2, and a velocity responsive controller which may be used as the controller 266 of Figure 2.

Referring to Figure 3, there is shown a housing 301, having an aperture in the central portion of its base, through which aperture passes a shaft 302, the lower end of which is keyed or otherwise adapted for operative connection with an extension of the shaft 32 of turbine 27 (see Figure 1). The center portion of the base of casing 301 carries a bearing 303 in which the shaft 302 is journaled. The casing 301 is provided with a cover 304 carrying a bearing 305 in its central portion, in which bearing the upper end of the shaft 302 is journaled.

A mass 306, having a hollow, generally cylindrical form is rotatably mounted on the shaft 302 by means of a bearing 307. A cover 308 is attached to the upper surface of the mass 306 by means of screws 310, and is provided with a bearing 311 in which the shaft 302 is journaled. A coil spring 312 has one end suitably attached to a collar 313 carried by the shaft 302, and its other end is received in a suitable aperture in an extension of the cover 308. The mass 306 is thereby flexibly connected to the shaft 302. When the shaft 302 is rotating at a constant speed, the angular position of the mass 306 with respect to the shaft 302 does not change, but upon acceleration of the shaft 302 the mass 306 changes its angular position with respect to the shaft 302 because of its inertia. The spring 312 permits a limited amount of relative movement of the shaft 302 and mass 306, and biases the mass 306 so that it always returns to the same angular position with respect to shaft 302 after such a relative movement.

The outer periphery of the cover 308 is beveled, and is adapted to interfittingly engage a similar beveled portion at the lower end of a cylindrical cam member 314. The cylindrical cam member 314 is held in place against the cover 308 by means of an outer clamping ring 315 which engages the outer surface of the beveled portion of cam member 314. The ring 315 may be clamped against the cover 308 by means of bolts 316. When so clamped, it holds the cam member 314 against rotation relative to the mass 306. By loosening the bolts 316, the cam member 314 may be adjusted to any desired angular position with respect to the mast 306.

The shaft 302 is slotted, as at 317. The portion of shaft 302 above the slot 317 is hollow. A pin 318 passes through the slot 317, and has its opposite ends fixed in a collar 319, which is slidable along the shaft 302. Because of the pin 318 and slot 317, the collar 319 is not rotatable with respect to shaft 302.

The collar 319 carries a spider comprising a plurality of arms 321, each of which has a bent-up extremity, and in that extremity carries a stub shaft 322, on which rotates a roller follower 323 for cooperation with the cylindrical cam 314. In the structure shown in the drawing, there are three arms 321 on the spider. The cam member 314 is circumferentially divided into three similar cam portions, having a gradual rise from the lowest point thereon to a high point thereon. At the high point of the cam, the cam surface suddenly rises, terminating in vertical portion, thereby limiting the angular movement of the cam with respect to the follower assembly, which includes the spider arms 321 and the followers 323. A collar 324 is fixed to the shaft 302 and carries a plurality of outwardly extending arms 325, which are equal in number to the spider arms 321. Each of the arms 325 has a bent-up portion 326, which is received in an aperture in one of the arms 321. The purpose of the arms 325 and their extensions 326 is to guide the follower assembly and to prevent its rotation relative to the shaft 302. While I prefer to use three similar cam portions, and three followers spaced at equal angles, because of balance considerations, it should be understood that any suitable number of cam portions and followers may be used.

Within the hollow portion of the shaft 302 above the pin 318, there moves a thrust rod 327. The thrust rod 327 is tapered at both ends to fit into craters in the pin 318 and in a cross head 328, whose ends are slidably received in a pair of spaced plates 330 and 331, the latter being broken away in the drawing to illustrate the parts beneath it. The rod 327 is preferably of smaller diameter than the passage through the shaft 302, so that it does not frictionally engage the shaft. Also, the tapered ends of the rod 327 may have a more acute angle than the craters in which they ride, so as to reduce friction at those points.

A U-shaped bracket 332 is pivotally mounted on the plates 330 and 331, as shown at 333. Only one leg of the U-shaped bracket 332 appears in the drawing, but it is believed that its construction will be readily apparent. A pin and slot connection 334 is provided so that the bracket 332 may be angularly adjusted about the pivot 333. The ends of the arms of the U-shaped bracket member 332 carry a shaft 335. Pivotally mounted on the shaft 335 is a bracket 336, a portion of which extends into the path of movement of the cross head 328. The right-hand portion of the bracket 336 terminates in a tongue 337. A tension spring 338 is stretched between the tongue 337 and another tongue 340 associated with the plates 330 and 331. The spring 338 biases the bracket 336 for counter-clockwise rotation about the shaft 335, thereby maintaining the bracket 336 in engagement with the cross head 328.

The left end of bracket 336 carries an insulating plate 341, on which is mounted a slider 342. The extremity of slider 342 cooperates with a slidewire resistance 343, which is mounted on the cover 304 of the casing 301. The opposite ends of the slidewire 303 are connected through conductors 344 and 345 to pins in a multiple plug electrical connector carried on a projection from plates 330 and 331. A cap 347 encloses the resistance 343 and its related elements. A pig tail connection 348 connects the slider 342 to another of the pins in the multiple plug electrical connector.

*Operation of acceleration responsive controller*

The shaft 302 rotates in a counter-clockwise direction as viewed from the bottom in Figure 3.

When the shaft 302 is rotating at a constant velocity, the angular position of the mass 306 relative to the shaft 302 is such that the followers 323 rest near the lower portions of the cam member 314. At that time, the pin 318 is near the bottom of the slot 317, and the slider 342 is near the lower end of the slidewire resistance 343.

Upon acceleration of the shaft 302, relative movement takes place between the mass 306 and the shaft 302, as previously explained. Since the cam 314 is fixed to the mass 306, and since the followers 323 move angularly with the shaft 302, the relative motion of the mass 306 and shaft 302 causes the followers 323 to be moved up the surfaces on the cam member 314, thereby moving the pin 318, the thrust rod 327, and the slider 342 upwardly. Movement of the slider 342 in an upward direction is equivalent to the movement of slider 253 of Figure 2 to the right along resistance 250.

*Velocity responsive controller*

A plate 350 is fixed on the shaft 302 just below the mass 306. The plate 350 is provided with diametrically opposite pairs of downwardly extending ears 351. In each of the pairs of ears 351 is journaled a shaft on which is carried a weight 352. An extension 353 of the weight 352 extends toward the shaft 302, so as to provide a sort of bell-crank lever arrangement. The extensions 353 on the weights 352 engage the upper surface of a housing 354 which is slidable on the shaft 302. A compression spring 355 is carried within the housing 354 and between the top of the housing and a nut 356, which is threaded on a sleeve 357 fixed on the shaft 302. The sleeve 357 is flattened along one side, as indicated at 358. A washer 360 retains the spring 355 between the nut 356 and the housing 354. The aperture in the washer 360 is shaped to conform with the sleeve 358, so that the washer is not rotatable on the sleeve. The washer 360 has a down struck lug 361 at one side thereof which engages one of the exterior surfaces of the nut 356 and prevents rotation of the latter.

When it is desired to adjust the tension in the spring 355, the washer 360 may be forced upwardly, freeing the down struck lug 361 from engagement with the nut, whereupon the nut 356 may be rotated on the sleeve 357. After the nut has been moved to its desired position, the washer 360 may then be released, allowing the lug 361 to again engage nut 356 and lock it against rotation.

The lower portion of the housing 354 is attached to a plate 362, which bears against a sleeve 359, nested within a cup-shaped member 363. The sleeve 359 is preferably made of Bakelite, or other suitable wear resisting material. The cup-shaped member 363 is pivotally mounted on a pair of stub shafts 369 (see Fig. 4), which are fixed at diametrically opposite points on the cup-shaped member 363, and are journaled in flanges on a lever 364. The lever 364 is pivoted on a shaft 365, which is journaled in a pair of ears bent up from the opposite sides of one end of a generally flat spring member 379. The other end of the spring member 379 is riveted, as at 359, to a plate 396 fixedly mounted in the casing 301. A bolt 397 passes through a nut 398, which is fixed to the casing 301 by any suitable means. The upper end of bolt 397 engages the under surface of spring member 379, which is self-biased into engagement with bolt 397. It will be seen that by turning the bolt 397, the fulcrum point of the lever 364 may be moved upwardly or downwardly, thereby providing an additional means for adjusting the speed of shaft 302 at which lever 364 is actuated to its controlling position, as explained hereinafter.

The lever 364 extends from the pivot 365 across the casing 301, spanning the shaft 302 and carrying a button 366 adapted to bear against the end of a clutch shaft 367, which is biased upwardly into engagement with the button 366 by means of a compression spring 368.

A portion of the shaft 302 is cut for a pinion gear as at 370, and a gear 371 mates with the pinion gear 370. The gear 371 is rotatably mounted on the clutch shaft 367. Through a suitable gearing connection, comprising gear 500, pinion 501 carried thereby and idler gear 502, a second gear 372 also rotatably mounted on the clutch shaft 367 is driven in the opposite direction to the gear 371 and at a lower speed. It may be for example, that the gear 372 is driven at one-third the speed of the gear 371. The clutch shaft 367 also carries a double faced clutch member 373, which is fixed on the said clutch shaft. Near its upper end, the clutch shaft carries a gear 374, which is also fixed on the clutch shaft, and which mates with a gear 375 fixed on a threaded shaft 376. An internally threaded nut 377 rides on the threaded shaft 376, and is moved therealong upon rotation of the shaft 376. The nut 377 carries a slider, not shown on the drawing, which engages the surface of a slidewire resistance 378 mounted in back of the shaft 376. An extension 380 at the end of lever 364 lies in the path of the nut 377 at the lower end of its range of movement.

*Operation of velocity responsive control device*

As long as the angular velocity of the shaft 302 is below a predetermined value, determined by the compressive force of spring 355, the clutch shaft 367 is biased upwardly by the springs 368 so that clutch 373 engages gear 372. At such a time, the clutch shaft 367 is rotated in a direction so that the threaded shaft 376 rotates to carry the nut 377 downwardly. If the rotative speed of the shaft 302 remains below the said predetermined value for a sufficient length of time, the nut 377 moves downwardly until it engages the extension 380 of the lever 364, whereupon the lever 364 is moved downwardly, carrying with it the clutch shaft 367 and causing disengagement of clutch 373 from the gear 372. Thereupon the clutch shaft 367 and the threaded shaft 376 are no longer rotated, and the slider carried by the nut 377 remains at the lower end of resistance 378.

If the angular velocity of the shaft 302 increases beyond the value determined by the compression of the spring 35, the centrifugal force acting on the weights 352 causes them to move outwardly, and the extensions 353 on the weights 352 move the housing 354 downwardly, thereby carrying the lever 364 downwardly. This further downward movement of lever 364 causes the clutch shaft 367 to be moved downwardly, carrying the clutch 373 into engagement with gear 371. The clutch shaft 367 is thereupon rotated in such a direction that the threaded shaft 378 rotates in a direction to move the nut 377 upwardly, thereby moving the slider carried by nut 377 upwardly along the resistance 378.

An upward movement of this slider along resistance 378 corresponds to a movement of slider 264 of Figure 2 to the left along resistance 261.

It may therefore be seen that as long as the angular velocity of shaft 302 remains below a predetermined value, the slider is maintained at the lower end of resistance 376. When it increases above that value, the slider is moved upwardly along the resistance 376. The position of the slider on the resistance 376 at any time is not determined by the angular velocity of the shaft 302 at that particular instant, but is determined by the length of time during which the angular velocity of the shaft 302 has been above that predetermined value, and by the particular variations in angular velocity of shaft 302 which have taken place since it first exceeded that predetermined value. The position of the slider along the resistance 378 is therefore determined by a time function of the velocity of shaft 302, integrated over the entire interval during which that velocity is greater than a predetermined value.

It has been found that, in an intake manifold pressure control system of the type described, the use of such a controller, which operates in accordance with an integrated function of the velocity of the compressor, provides a control which effectively limits the angular velocity of the compressor without establishing a definite and absolute limit which would result in a hunting condition being set up.

A limit control of the type described effectively prevents the limiting condition from rising above a predetermined value, but nevertheless under any given set of conditions, permits a further increase in the limiting condition, and thereby prevents sudden unbalancing effects in the system which might cause undesirable hunting conditions to be established.

FIGURE 5

I have illustrated in Figure 5 a modification of the mechanical connections between the throttle motor, the throttle, and the manually operable lever 55 of Figure 2, wherein a single electromagnet 400 performs the functions of both the electromagnets 48 and 52 of Figure 2. Those elements in the structure of Figure 5 which are fully equivalent to the corresponding elements of Figure 2 have been given the same reference characters. Those elements will not be further described.

The electromagnet 400 in Figure 5 has a winding 401 and an armature 402, which is pivotally attached to one arm of a bell-crank lever 403. The lever 403 is pivotally mounted on a suitable support 404. The end of the arm of lever 403 to which armature 402 is attached is slotted to receive a pin carried on the end of a thrust rod 405. The thrust rod 405 carries the brake shoe 47 at its inner end, and is adapted to slidably pass through an aperture in a suitable supporting structure 406.

The other end of the bell-crank lever 403 terminates in an elongated arcuate portion 407, which is concentric with the shaft 42. A tension spring 408 biases the lever 403 for rotation about its pivot in a clockwise direction, against the force exerted by the electromagnet 400.

The arm 53 carries a bracket 410 which projects between the arcuate surface of the plate 41 and the arcuate portion 407 of bell-crank lever 403. The bracket 410 is apertured to permit the passage of a pin 411. The pin 411 is provided with a wide head at its upper end, the upper surface of which conforms to the lower surface of the arcuate portion 407 of lever 403. A compression spring 412 surrounds the pin 411 bearing at its upper end on the head of the pin 411 and at its lower end on the bracket 410.

The lower end of the pin 411 is adapted to engage the notch 50 in the plate 41. The compression spring 412 biases the pin 411 upwardly, so that the pin is normally free from the notch 50.

When the parts are in the position shown in the drawing, the electromagnet 400 is energized, and the brake shoe 47 is thereby held in engagement with the ring gear 46. The link 19 through which the throttle is driven is then operably connected to the shaft 42. At the same time, the arcuate portion 407 of bell-crank lever 403 is held in the position shown, wherein it is sufficiently spaced from the plate 41 so that the spring 412 maintains the pin 411 out of engagement with the notch 50.

When the power to the electromagnet coil 401 is cut off, either by a failure of the source of power or by the opening of a switch such as the switch 66 of Figure 2, the bell-crank lever 403 is moved clockwise from the position shown in the drawing by the biasing spring 408. The thrust rod 405 is therefore moved to the left, releasing the brake shoe 47 from the ring gear 46. Since the spring 408 is stronger than the compression spring 412, the arcuate portion 407 of lever 403 moves downwardly, forcing the pin 411 downwardly and into engagement with the plate 41. As in the case of the device shown in Figure 2, the pin 411 moves directly into the notch 50 if it happens to be aligned therewith. If it is not aligned therewith, the operator may move the arm 53 back and forth until the pin 411 becomes aligned with the notch 50, whereupon it will engage that notch, and the operator may thereafter position the throttle manually by operation of the manual control lever.

FIGURE 6

In Figure 6 I have illustrated a modification of my selective manual and automatic control mechanism wherein the throttle and the manual control lever automatically assume corresponding positions when the system is placed under manual control, so that the pilot or other operator does not have to "fish" for the throttle position, as in the systems of Figures 2 and 5. Those elements in Figure 6 that correspond to equivalent elements in Figure 2 have been given the same reference characters.

The planet gears 45 of Figure 6 are carried by a spider 420. The spider 420 also has an arm 421, at the extremity of which the link 19 is pivotally connected. Another link 422 is also pivotally attached to the extremity of arm 421. The opposite end of link 422 carries a roller 423.

A pedestal 424, which may be mounted in the pilot's compartment of the aircraft, pivotally supports, as at 425, a manual control lever 426. The upper end of lever 426 is provided with a handle 427, by which the lever 426 may be rotated about its pivot 425. The lower end of lever 426 carries a slider 428 which cooperates with a slidewire resistance 430. The slider 428 and the resistance 430 of Figure 6 correspond to the slider 234 and resistance 231 of Figure 2.

The manual control lever 426 is provided with a generally triangular aperture 431, within which the roller 423 is positioned. The lower vertex of the aperture 431 is provided with a narrow vertical portion, or notch, so that the link 422 is effectively pivotally attached to the lever 426 by the roller 423 when the latter rests in this narrow vertical portion.

A plate 432 is attached, as by pin and slot connection, to one surface of the pedestal 424. A tension spring 433 biases the plate 432 for movement in a downward direction from the position shown in the drawing. The plate 432 is maintained in the position shown by a latch plate 434, which is mounted, as by pin and slot connection, on the top of the pedestal 424 and which carries a hook 435 adapted to engage a flange on the plate 432.

The latch plate 434 is also provided with a handle 436, by means of which the hook portion 435 may be moved to a position where it is out of engagement with the flange on the plate 432. When this occurs, the plate 432 is moved downwardly by the spring 433, thereby carrying the link 422 downwardly and moving the roller 423 into engagement with the narrow vertical portion of the aperture 431. If the lever 426 happens to be in a different angular position from that shown in the drawing when the plate 432 is released, the roller 423 engages one of the sides of the aperture 431. The spring 433 is strong enough to act through the roller 423 and cause rotation of lever 426 about its pivot 425.

This rotation of lever 426 continues until the roller 423 rests in the lower vertex of the aperture 431. It may be seen that at such a time, the handle 427 has been moved to a position corresponding to that of the throttle 17. With the foregoing structure, if there should be a failure of electric power to the motor 100 and the electromagnet 48, or if such power has been intentionally interrupted by the pilot so that he can take over manual control of the apparatus, the only other act necessary by the pilot is for him to strike the handle 436 of the latch plate 434, whereupon the hook 435 disengages the plate 432. The plate 432 is thereupon moved downwardly by the spring 433 so that the roller 423 of the shaft 422 moves into the vertex of the aperture 431 in the plate 426. If the plate 426 is relatively loose, then it is moved to a position corresponding to the position of throttle valve 17 in the manner explained above.

In some instances, friction members are applied to the shaft 425 and plate 426 so that the handle 427 tends to remain in any position in which it is placed, although it can be nevertheless manually moved by the pilot. Under such conditions, upon release of plate 432 the spring 433 cannot rotate the plate 426. The throttle 17, however, moves relatively easily and, when such an arrangement is used, the throttle 17 will move to a position corresponding to the position to which the pilot has adjusted the plate 426 by the handle 427. In this manner, the pilot may place the manual control in a desired position before he places the apparatus under manual control. Then upon interrupting the circuits and striking the handle 436, the throttle 17 will automatically move to the desired position.

When power is restored to the electromagnet 48 and the motor 100, the pilot may restore the throttle to automatic control by manually lifting the link 422 until the plate 432 is in a position where it may be engaged by the latch 435.

FIGURE 7

In Figure 7 I have shown a modification of the structure of Figure 6, wherein the latching mechanism is automatically tripped upon failure of the power supply or other deenergization of the control system.

In Figure 7, the flange 440 on the plate 432 is held by a latch 441 carried at the end of a pivoted armature 442 which cooperates with an electromagnet 443. A tension spring 444 biases the armature 442 against a stop 445, in which position the plate 440 is free from the latch 441. When the electromagnet 443 is denergized, the armature 442 assumes that unlatched position, thereby releasing the plate 432, and placing the throttle under manual control. When power is restored to the system, the armature 442 is again moved to the position shown in the drawing against the tension of the spring 444. Thereafter, the plate 432 may be moved upwardly, whereupon the flange 440 will pass over the surface of the latch 441 and be engaged by its hook-shaped upper surface.

FIGURE 8

There is illustrated in Figure 8 a modification of my selective automatic or manual control mechanism, wherein the throttle is automatically placed under the control of the manually operated lever when the power is turned off the system, and wherein the mechanism is automatically reset upon the return of power so as to restore the throttle to automatic control without the necessity of a manual resetting operation such as is required in the case of the arrangement disclosed in Figures 6 and 7. In Figure 8, those elements which are the full equivalent of the corresponding elements in Figure 2 have been given the same reference characters.

In Figure 8 there is shown a link 450, which may be operated by a suitable manual control lever in the same manner as the link 54 of Figure 2 is operated by the manual control lever 55. The link 450 is pivotally attached to a lever 451, which is pivotally mounted at 452. The lower end of lever 451 carries a slider 453 which cooperates with a resistance 454. The slider 453 and the resistance 454 correspond to the slider 234 and the resistance 231 of Figure 2.

The upper portion of the lever 451 is provided with a triangular aperture 455, of the same general shape as the aperture 431 in Figure 6. The upper vertex of the aperture 455 is provided with a narrow vertical portion, or notch, which is adapted to snugly receive a roller 456 carried at the end of a link 457. The other end of the link 457 is pivotally attached to the end of the arm 421 which is driven by the motor 100 through the planetary gear train 43 during the automatic operation of the throttle.

Another link 460 is pivotally attached to the link 457 at an intermediate point thereon. The opposite end of link 460 is pivotally attached to the end of one arm of a bell-crank lever 461, which is mounted for free rotation on a shaft 462. The opposite end of lever 461 is connected by a tension spring 463 to a suitable support, so that the lever 461 is biased for rotation in a clockwise direction from the position shown in the drawing.

The shaft 462 may be driven by a motor 464 acting through a gear train 465.

The shaft 462 may be operably connected to the bell-crank lever 461 through a planetary gear mechanism generally indicated at 466. The planetary gear mechanism 466 includes a sun gear 467 fixed on the shaft 462, a plurality of planet gears 468 carried by the bell-crank lever 461, and an internal ring gear 469, which encircles the planet gears 468 and is suitably supported so as to be maintained enmeshed with the planet gears 468, and at the same time to permit freedom of rotation of the ring gear 469 about the shaft 462.

A brake shoe 470 is provided for operative engagement with the external surface of the ring gear 469 so as to lock that gear against rotation.

The brake shoe 470 associated with the ring gear 469 of the planetary gear mechanism 466 and the brake shoe 47 associated with the ring gear 46 of the planetary gear mechanism 43 are both carried by a toggle linkage arrangement generally indicated at 471. This toggle linkage includes a link 472 attached to the armature 473 of an electromagnet 474. The armature 473 is biased by a spring 476 to a position wherein the toggle linkage 471 releases both the brake shoe 47 and 470 from the surfaces of their cooperating ring gears. Upon energization of coil 475 of electromagnet 474, the armature 473 is moved downwardly to the position shown in the drawing, and the toggle linkage 471 is operated to force both the brake shoes 470 and 47 into engagement with their respective ring gears, thereby locking those gears against rotation.

The motor 464 is connected by conductors 480 and 481 to power supply lines 482 and 483, respectively. A switch 484 and a fuse 485 are connected in series with the line 482. The winding 475 of electromagnet 474 is connected to lines 482 and 483 by conductors 486 and 487 respectively. The supply lines 482 and 483 are also connected to the throttle amplifier 111 and the waste gate amplifier 211 to supply power to the amplifier.

Operation of Figure 8

When the parts are in the positions shown in the drawing, the position of the throttle 17 is controlled by the motor 100. The electromagnet 474 is energized, thereby maintaining the brake shoe 47 in engagement with the ring gear 46, and completing the driving connection between the motor 100 and the throttle 17. The brake shoe 470 likewise engages the ring gear 469, completing the driving connection between the motor 464 and the bell-crank lever 461. The bell-crank lever 461 has reached its limit of motion in a counter-clockwise direction, since it engages the stop 492. Therefore, the motor 464 is stalled. Manual operation of the lever 451 through the link 450 at this time causes the positioning of slider 453 relative to resistance 454, and does not directly affect the position of the throttle 17.

Now let it be assumed that the system is deenergized, which may result either from failure of the power supply, or from opening of the switch 484. Deenergization of electromagnet 474 causes both the brake shoes 47 and 470 to release their respective ring gears. Therefore, the driving connection between motor 100 and throttle 17 is interrupted, since the arm 421 may now rotate freely, regardless of the position of the sun gear 44 which is driven by motor 100. Similarly, the release of the ring gear 469 by the brake shoe 470 allows the bell-crank lever 461 to turn in a clockwise direction under the influence of the biasing spring 463. As the bell-crank lever 461 turns clockwise, the link 457 is moved upwardly, and the roller 456 moves upwardly until it engages the inner surface of the aperture 455. When the roller 456 engages the inner surface of aperture 455, the lever 451 is driven thereby into a position corresponding to that of throttle 17.

If the link 450 is locked at this time, the engagement of roller 456 with the inner surface of the aperture 455 results in a positioning of the throttle 17 so that its position corresponds with that of the manual lever which controls the link 450.

Upon restoration of power to the system, the electromagnet 474 is again energized, thereby moving the brake shoe 47 into engagement with the ring gear 46. This places the throttle 17 under control of motor 100. At the same time, the brake shoe 470 is operated to lock the ring gear 469, thereby completing the driving connection between the motor 464 and the bell-crank lever 461. The connections of the motor 464 are such that it is energized for operation in a direction to drive the bell-crank lever 461 in a counter-clockwise direction against the tension of spring 463. Rotation of the bell-crank lever 461 in a counterclockwise direction causes the roller 456 to move downwardly into the wide portion of the aperture 455, thereby releasing the mechanical connection between the link 450 and the throttle 17. The bell-crank lever 461 continues to rotate counterclockwise until it engages stop 492, whereupon motor 464 is stalled.

It may therefore be seen that in the arrangement of Figure 8, the throttle 17 is positioned by the motor 100 as long as power is supplied to the system, but when the supply of power to the system is discontinued, the throttle lever 17 is mechanically connected to the manually operated link 450, and when power is returned to the system, the mechanical connection between throttle 17 and link 450 is interrupted and the throttle 17 is again placed under control of the motor 100 without the necessity of any manual resetting operation.

While I have shown and described certain preferred embodiments of my invention, other modifications thereof will occur to those skilled in the art, and I therefore wish my invention to be limited only by the appended claims.

I claim as my invention:

1. Control apparatus, comprising in combination, a load device to be positioned, electrical motor means for positioning said load device, a manually operable control member, a first pivotally mounted member attached to said load device for simultaneous movement therewith, a second member pivotally mounted concentric with said first member and manually movable, an electromagnet mounted on one of said pivotally mounted members, said electromagnet comprising an electrical winding, an armature movable toward said winding upon energization thereof, and spring means biasing said armature away from said winding, the other of said pivotally mounted members having an arcuate surface concentric with said pivotal mounting and notched to receive said armature upon movement thereof away from said winding, said armature serving upon engagement with said notch as a mechanical connection between said members, and means connecting said winding and said motor means to the same source of electrical energy.

2. Control apparatus, comprising in combination, a load device to be positioned, electrical motor means for driving said load device, a planetary gear train between said motor means and said load device including one gear which when said gear is held stationary operatively connects the motor means to the load device and when said gear is released operatively disconnects the motor means from the load device, a manually operable control member, a first element connected to said manually operable control member, a second element connected to said load device, means biasing said elements into engagement with each other, said elements having inter-engaging parts of such nature that they can be engaged together in only one relative position to each other, and means including at least one electromagnet and operative when said electromagnet is energized to hold said gear and to hold said elements disengaged against the action of said biasing means, and operative when said electromagnet is deenergized to release said gear and to allow said elements to move out of their disengaged position under the influence of said biasing means.

3. Control apparatus, comprising in combination, a load device to be positioned, electrical motor means for positioning said load device, a manually operable control member, an element movable between a first position wherein it mechanically connects said member and said load device and a second position wherein said member is mechanically disconnected from said load device, means biasing said element to said first position, means including an electromagnet and operative when said electromagnet is energized to hold said element in said second position against the action of said biasing means, motive power means, means operable to connect said motive power means to said element to drive said element to said second position, said connecting means comprising a planetary gear train, means connecting said motive power means to one gear of said train, means operable to hold another gear of said train against rotation, and means operable to connect a third gear of said train to said element.

4. Control apparatus, comprising in combination, a load device to be positioned, electrical motor means for driving said load device, a first gear train between said motor means and said load device including one gear which when said gear is held stationary operatively connects the motor means to the load device and when said gear is released operatively disconnects the motor means from the load device, electromagnetic means effective when energized to hold said one gear to connect said motor means to said load device and when deenergized to release said one gear, a manually operable control member, an element movable between a first position wherein it mechanically connects said member and said load device and a second position wherein said member is mechanically disconnected from said load device, means biasing said element to said first position, additional electrical motor means for driving said element to said second position, a second gear train between said additional motor means and said element including one gear which when said gear is held stationary operatively connects the motor means to the element to drive said element to said second position and to retain it in that position and when said gear is released operatively disconnects the motor means from the element, and electromagnetic means effective when energized to hold the said one gears of both said gear trains and when deenergized to release said one gears.

5. Control apparatus, comprising in combination, a load device to be positioned, electric motor means arranged for connection to drive said load device, electric circuit means connected to said motor to control the operation thereof, said circuit means comprising a variable resistance device responsive to a pressure condition and a second variable resistance device electrically connected to said first named resistance device for adjusting the value of said pressure condition at which said load device is maintained in a predetermined position by said motor means, a manually movable member connected to adjust said second variable resistance device, and means for disconnecting said motor means from said load device and for connecting said load device to said manually movable member for operation thereby.

6. Electrical control apparatus, comprising in combination, a load device to be positioned, electrical motor means for driving said load device, electrical circuit means including means for varying an electrical quantity therein in accordance with a condition indicative of the need for operation of said load device, means responsive to a deviation in the value of said quantity from a predetermined value for controlling said motor means, means driven by said motor means for restoring said electrical quantity to said predetermined value, electrical means for adjusting the value of said condition at which said load device is maintained in a predetermined position by said motor means, a manually movable member for controlling said electrical adjusting means, means operable to releasably connect said member and said load device, and electrical means operative when energized to connect said motor means and said load device and to maintain said member disconnected from said load device and when deenergized to permit connection of said member and said load device and to operatively disconnect said motor means from said load device.

7. Apparatus for controlling the position of the throttle of an internal combustion engine, comprising in combination, motor means for driving said throttle, means for controlling said motor means including a device responsive to a condition indicative of the need for operation of said throttle, electrical means for adjusting the value of said condition at which said throttle is maintained in a predetermined position by said motor means, a manually movable member for operating said electrical adjusting means, and means for disconnecting said motor means from said throttle and for connecting said throttle to said manually movable member for operation thereby.

8. Apparatus for controlling the pressure in the intake manifold of an internal combustion engine provided with a throttle for regulating the supply of air to said manifold, comprising in combination, motor means for driving said throttle, means for controlling said motor means including a variable impedance device responsive to the pressure in said intake manifold, variable impedance means for adjusting the pressure value at which said throttle is maintained in a predetermined position by said motor means, a manually movable member for operating said adjusting means, and means for disconnecting said motor means from said throttle and for connecting said throttle to said manually movable control member for operation thereby.

9. Apparatus for controlling the pressure in the intake manifold of an internal combustion engine provided with a throttle for regulating the supply of air to said manifold, and a compressor driven by a turbine powered with exhaust gases from said engine, comprising in combination, first motor means for driving said throttle, means for controlling the compression ratio of said compressor, second motor means for driving said compression ratio controlling means, means for controlling said first and second motor means including a device responsive to the pressure in said intake manifold, said controlling means being responsive to an operation of said device indicative of a decrease in said pressure first to control said first motor means to open said throttle and thereafter to control said second motor means to increase said compression ratio, means for adjusting the pressure value at which said throttle and compression ratio controlling means are maintained in predetermined positions, a manually movable member for operating said adjusting means, and means for disconnecting said first motor means from said throttle and for connecting said throttle to said manually movable control member for operation thereby.

10. Electrical apparatus for controlling the pressure in the intake manifold of an internal combustion engine provided with a throttle for regulating the supply of air to said manifold, comprising in combination, electrical motor means for driving said throttle, means for controlling said motor means including a variable resistance device responsive to the pressure in said intake manifold, variable resistance means for adjusting the pressure value at which said throttle is maintained in a predetermined position by said motor means, a manually movable member for operating said adjusting means, means operable to releasably connect said member and said throttle, electrical means operative when energized to connect said motor means and said throttle and to maintain said member disconnected from said throttle and when deenergized to permit connection of said member and said throttle and to operatively disconnect said motor means from said throttle, a source of electrical energy, and means connecting both said electrical means and said motor means to said source.

11. In combination, an engine fuel control means, a lever for moving said fuel control means to control the manifold pressure, automatic control means to disconnect said lever from said fuel control means and thereafter, responsive to variation in manifold pressure, to move said fuel control means to maintain a substantially constant manifold pressure, and variable impedance means responsive to the position of said lever to calibrate said automatic control means to maintain a predetermined pressure.

12. In combination, an engine fuel control means, a lever for moving said fuel control means to establish a manifold pressure, automatic electrical means, including means to disconnect said lever from said fuel control means, responsive to variations in manifold pressure, to move said fuel control means to maintain substantially constant, the manifold pressure established by said lever, and electrical means to establish a new manifold pressure which will be thereafter maintained constant by the automatic control means, without re-establishing the manual control.

13. A throttle control system for regulating manifold pressures comprising, in combination, a manual means and an electric means for adjusting the throttle, a single solenoid, a clutch apparatus controlled by the solenoid comprising mechanical means movable in one direction when the solenoid is energized to connect the electric means to the throttle and in the opposite direction when the solenoid is deenergized to disconnect the motor and connect the manual means to the throttle, and means included in said apparatus effective when the manual means is connected to the throttle to cause the manual means to indicate physically the position of the throttle.

14. A throttle control system comprising, in combination, manual and electric means for moving said throttle to provide a desired manifold pressure, a single clutch apparatus movable to interconnect either said manual moving means or said electric moving means with said throttle, said clutch apparatus being so constructed as to be effective upon disconnection of said electrical means and connection with said throttle for causing said manual moving means to indicate the position of said throttle.

ALBERT E. BAAK.

REFERENCES CITED

The following references are of record in the file of this patent:

UNITED STATES PATENTS

| Number | Name | Date |
|---|---|---|
| 561,272 | Ongley | June 2, 1896 |
| 1,472,257 | Titterington | Oct. 30, 1923 |
| 1,536,081 | Dean | May 5, 1925 |
| 1,832,189 | De Giorgi | Nov. 17, 1931 |
| 1,864,653 | Jones | June 28, 1932 |
| 2,083,532 | Kronmiller | June 8, 1937 |
| 2,086,030 | Hodgson | July 6, 1937 |
| 2,352,140 | Trott | June 20, 1944 |
| 2,358,363 | Truesdell | Sept. 19, 1944 |
| 2,387,215 | Fawkes | Oct. 16, 1945 |
| 2,397,068 | Wilson | Mar. 19, 1946 |
| 2,438,690 | Andrews et al. | Mar. 30, 1948 |